No. 680,595. Patented Aug. 13, 1901.
J. G. INSHAW.
MANUFACTURE OF HOLLOW BLOOMS FOR PRODUCING TUBES, HOLLOW SHAFTING, AXLES, &c., FROM COMMON PUDDLED IRON OR OTHER METALS.
(Application filed July 2, 1901.)
(No Model.)

WITNESSES:
F. W. Wright
P. C. Connor

INVENTOR
JOHN GEORGE INSHAW
BY
Howson and Howson
HIS ATTORNEYS.

THE NORRIS PETERS CO., PHOTO-LITHO., WASHINGTON, D. C.

UNITED STATES PATENT OFFICE.

JOHN GEORGE INSHAW, OF BIRMINGHAM, ENGLAND, ASSIGNOR OF TWO-THIRDS TO FREDERICK BILLING AND FRANCIS BILLING, OF SAME PLACE.

MANUFACTURE OF HOLLOW BLOOMS FOR PRODUCING TUBES, HOLLOW SHAFTING, AXLES, &c., FROM COMMON PUDDLED IRON OR OTHER METALS.

SPECIFICATION forming part of Letters Patent No. 680,595, dated August 13, 1901.

Application filed July 2, 1901. Serial No. 66,859. (No model.)

*To all whom it may concern:*

Be it known that I, JOHN GEORGE INSHAW, engineer, a subject of the King of Great Britain and Ireland, residing at Frederick road, Aston Manor, Birmingham, in the county of Warwick, England, have invented certain new and useful improvements in the manufacture of hollow blooms for producing tubes, hollow shafting, axles, and other similar hollow articles from common puddled iron or other metals; and I do hereby declare the following to be a full, clear, and exact description of the invention, such as will enable others skilled in the art to which it appertains to make and use the same.

This invention relates generally to an improved method for producing hollow blooms from common puddled iron or other metals for use in the manufacture of homogeneous tubes and other similar hollow articles, such as hollow shafting and axles.

The principal object of this invention is to produce hollow blooms from common puddled iron to more advantage than hitherto by reducing the number of heatings and operations hitherto necessary for this purpose.

The manner in which my invention may be carried into effect will be fully understood from the following description by reference to the accompanying drawings, in which—

Figure 1:
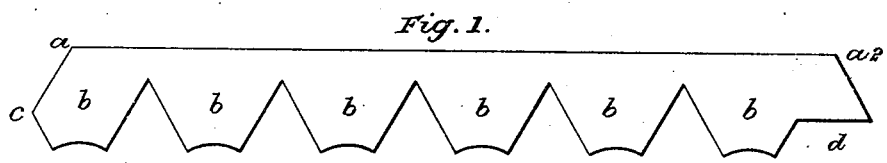
Figure 2:
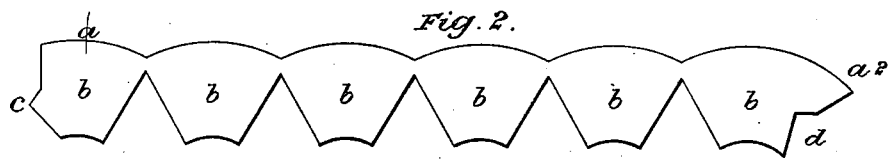
Figure 3:
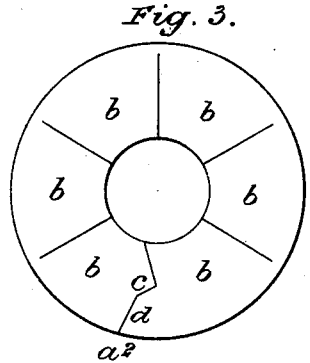

Figure 1 is a transverse section of a bar of puddled metal, illustrating the first step of my new method. Fig. 2 is a modified form thereof, and Fig. 3 illustrates an end view of a bar bent or rolled into a hollow bloom according to my invention.

In order to gain the greatest advantage in the way of cheap production according to this invention, bars of common puddled iron are used, (although other metal may be used, if desired,) and by rolling them as hereinafter described they are converted into round hollow blooms at one heat.

It has been proposed to use a hollow core and to build a pile of iron around the said hollow core; but according to this invention bars of puddled iron (or other metal of which the tubes or the like are to be formed) are rolled in suitable rolls, so as to be plain or approximately plain on one side and to have longitudinal segmental projections on the other side, as illustrated in transverse section in Figs. 1 and 2 of the accompanying drawings, thereby leaving a backing which constitutes practically a thin belt of metal from $a$ to $a^2$, holding the said longitudinal segmental projections $b$ together during the process of rolling, cutting, and welding. In Fig. 1 I have shown the belt or backing $a\ a^2$ flat; but in Fig. 2 it is shown as being rolled curved at the back of each projection $b$ in arcs corresponding to the external circumference of the bloom to be produced. The triangular spaces between the segmental projections $b$ are such that the projections gradually decrease in width in proportion to the decrease in diameter between the outer and inner circumference of the bloom to be produced. After the rolling process is completed the said backing or thin belt of metal $a\ a^2$ is bent so as to bring the said longitudinal segmental projections $b$ together, as illustrated in transverse section in Fig. 3, in which the bar illustrated in Fig. 2 is shown so bent, and in order to insure a clean and perfect weld in the process of bending the said backing or thin belt of metal $a\ a^2$ is kept uppermost, allowing the said longitudinal segmental projections $b$ to hang downward, thereby allowing the scale and other refuse detached by the operation to drop out from between the meeting surfaces and the said longitudinal segmental projections to come close together ready for welding. The said backing or thin belt $a\ a^2$ and longitudinal segmental projections $b$ being thus formed into a round hollow bloom after being cut into convenient lengths is placed in a suitable furnace and heated to a temperature sufficient to weld the abutting projections together, and thereby convert the said round hollow bloom into a welded hollow bloom, which may be transformed into tubes or the like of the required size by the same process as that commonly adopted when tubes are made from drilled or pierced metal blooms. As there is no internal core, the process of forming the bloom and tubes or the like forces the projections *b* inward and effects a very efficient welding of the joints. In order that there shall not be a welded joint in one straight line from the inside to the outside circumference, the parts of the bar which are to form the joint are preferably made as illustrated—namely, with a projecting part at *c* to engage with a recessed part at *d*.

Having now particularly described and ascertained the nature of this invention and in what manner the same is to be performed, I declare that what I claim is—

1. The herein-described improvement in the manufacture of hollow blooms for producing tubes and the like, consisting in forming a bar of puddled iron, or other metal, of which the tube, or the like is to be formed, with longitudinal segmental projections, connected by a backing or thin belt of the metal, and bending the bar and bringing the segmental projections together so as to form the hollow bloom, substantially as described.

2. The herein-described improvement in the manufacture of hollow blooms for producing tubes and the like, consisting in forming a bar of puddled iron, or other metal, of which the tube or the like is to be formed, with longitudinal segmental projections connected by a backing or thin belt of metal, bending the said bar and bringing the segmental projections together so as to form a hollow bloom, and then heating the said bloom to a sufficient temperature to weld the abutting projections, substantially as described.

In testimony whereof I affix my signature in presence of two witnesses.

JOHN GEORGE INSHAW.

Witnesses:
W. GERALD REYNOLDS,
PERCY R. GOLDRING.